United States Patent [19]

Schultz

[11] Patent Number: 5,309,030
[45] Date of Patent: May 3, 1994

[54] CURRENT SOURCE FOR A SUPPLEMENTAL INFLATABLE RESTRAINT SYSTEM

[75] Inventor: Frederich H. Schultz, Santa Barbara, Calif.

[73] Assignee: Delco Electronics Corporation, Kokomo, Ind.

[21] Appl. No.: 963,182

[22] Filed: Oct. 19, 1992

[51] Int. Cl.$^5$ .............................................. B60R 21/32
[52] U.S. Cl. ................................... 307/10.1; 340/436; 280/735
[58] Field of Search ..................... 307/10.1; 280/735; 180/274, 282; 340/436

[56] References Cited

U.S. PATENT DOCUMENTS

| | | | |
|---|---|---|---|
| 3,792,289 | 2/1974 | Kazem | 361/100 |
| 4,438,424 | 3/1984 | Yasui | 340/52 |
| 4,673,912 | 6/1987 | Kumasaka et al. | 340/52 |
| 4,835,513 | 5/1989 | McCurdy et al. | 340/438 |
| 4,887,843 | 12/1989 | Husby | 280/735 |
| 4,938,504 | 7/1990 | Fukuda et al. | 280/731 |
| 4,990,884 | 2/1991 | McCurdy et al. | 340/438 |
| 4,994,972 | 2/1991 | Diller | 364/424 |
| 4,999,775 | 3/1991 | Muraoka | 364/424 |
| 5,018,763 | 5/1991 | Okano et al. | 280/735 |
| 5,046,149 | 9/1991 | Nunan | 307/10 |
| 5,068,640 | 11/1991 | Burger et al. | 340/438 |
| 5,155,376 | 10/1992 | Okano | 307/10.1 |

*Primary Examiner*—A. D. Pellinen
*Assistant Examiner*—Peter Ganjoo
*Attorney, Agent, or Firm*—Anthony Luke Simon; Mark A. Navarre

[57] ABSTRACT

A supplemental inflatable restraint system with a controllable current source comprises a sense element, a switch device coupled to the sense element, and a squib coupled to the switch device, wherein the sense element, switch device and squib are coupled in a series circuit between a power source and a ground. A deploy control circuit is coupled to the switch device, and, in response to a deploy command, forward biases the switch device allowing electric current to flow through the sense element, switch device and squib to deploy a supplemental inflatable restraint. A current control circuit is coupled to the sense element and switch device and responds to the current flow through the sense element and regulates the switch device, effectively limiting current through the series circuit to a predetermined value.

3 Claims, 2 Drawing Sheets

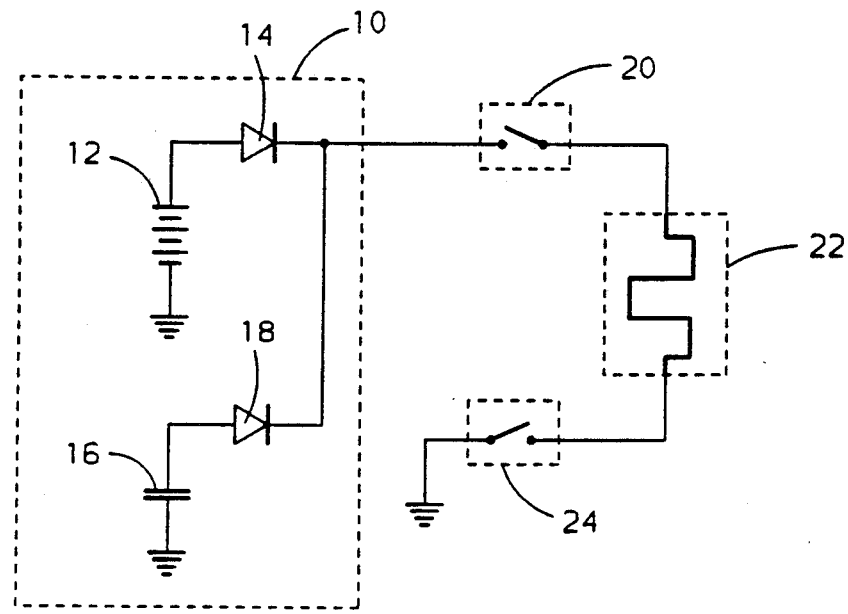
PRIOR ART
FIG. 1
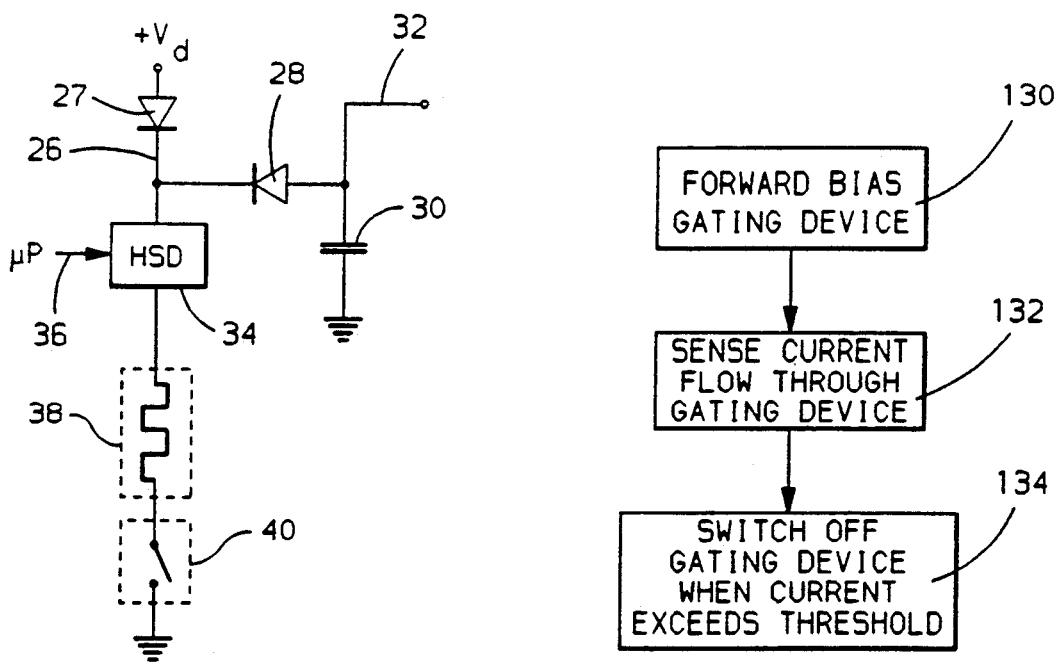
FIG. 2
FIG. 4

CURRENT SOURCE FOR A SUPPLEMENTAL INFLATABLE RESTRAINT SYSTEM

This invention relates to controlled current sources and, more particularly, to a controlled current source for a supplemental inflatable restraint.

BACKGROUND OF THE INVENTION

A typical supplemental inflatable restraint activation circuit is shown in FIG. 1. The circuit is provided with power source 10 comprising vehicle battery 12 supplying power through diode 14 and comprising storage capacitor 16 providing power through diode 18. Storage capacitor 16 is used in the event vehicle battery 12 is disconnected during a deployment situation. During a sudden deceleration of the vehicle in which it is desirable to deploy the supplemental inflatable restraint system, electromechanical sensors 20 and 24 close, closing the current path between power source 10 and ground through squib 22, which is an ignitable initiator that causes inflation of the supplemental inflatable restraint.

In the systems of the type shown in FIG. 1, when the sensors 20, 24 close during a sudden deceleration such as would require deployment of the supplemental inflatable restraint, the current that passes through the sensors is limited only by the electrical resistance of squib 22 and the energy input from power source 10. The result of the high current flow through sensors 20 and 24 causes arching of the contacts as the sensors' switches close. This arcing destroys the switches by damaging contact surfaces so that the switches cannot be re-used. If electrical type switching devices are used, the high current initiated through the electrical switching devices can destroy those devices.

What is desired is a suitable controlled current source for use during deployment of a supplemental inflatable restraint.

SUMMARY OF THE PRESENT INVENTION

This invention is an efficient and cost effective apparatus that limits electrical current carried by components of a supplemental inflatable restraint system during deployment of the supplemental inflatable restraint.

Advantageously, the apparatus and method of this invention decrease the cost of implementation of a inflatable restraint system and increase the reusability of supplemental inflatable restraint system components. Advantageously, the apparatus of this invention allows for a decrease size of the energy reserve device used in the supplemental inflatable restraint system.

Advantageously, the apparatus of this invention is capable of supplying, in a preferred mode, a regulated current of 2 amperes during deployment of a supplemental inflatable restraint. Advantageously, the apparatus of this invention is capable of supplying maximum current into low impedance loads for a sustained time period after interruption of vehicle supply current.

Structurally, the apparatus of this invention comprises a sensing element, a switch device, a squib, a deploy control circuit and a current control circuit. The sensing element, switch device and squib are coupled in series between an energy source and ground. The deploy control circuit is coupled to the switch device, and in response to a deploy command, forward biases the switch device to allow current to flow through the squib, deploying the supplemental inflatable restraint. The current control circuit monitors current through the sense element and regulates the switch device, effectively limiting current through the series circuit to a predetermined value.

A more detailed description of this invention, along with various embodiments thereof is set forth below.

BRIEF DESCRIPTION OF THE DRAWINGS

FIG. 1 is an illustration of a typical supplemental inflatable restraint system.

FIG. 2 is an illustration of a supplemental inflatable restraint system according to this invention.

FIG. 4 illustrates the method of this invention.

DETAILED DESCRIPTION OF THE INVENTION

Figure 3:
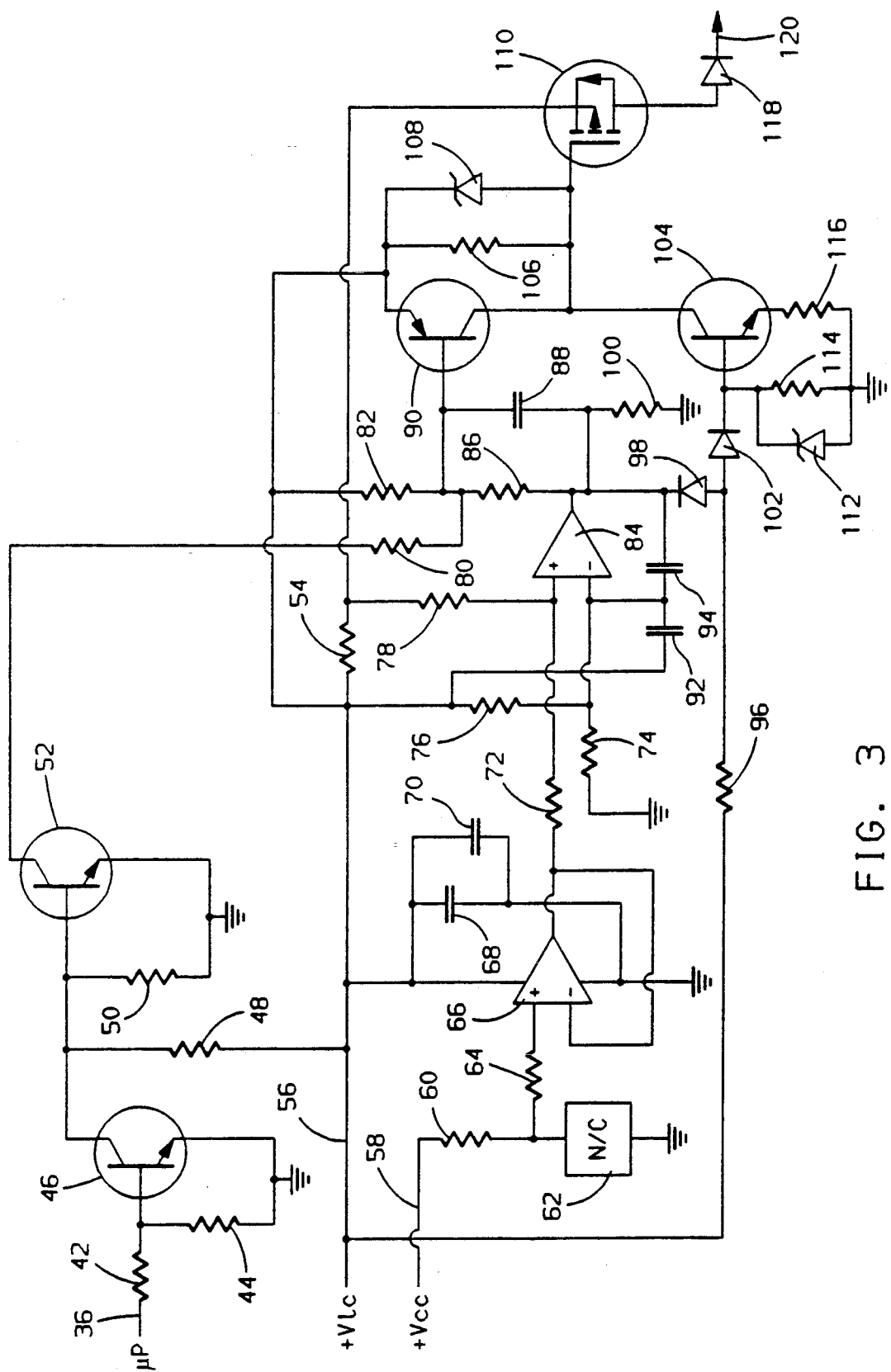
FIG. 3 illustrates a detailed implementation of the apparatus of this invention.

Referring to FIG. 2, the current source 34 of this invention is implemented in the supplemental inflatable restraint system shown to provide improved control of deployment of the supplemental inflatable restraint through controlled ignition of squib 38. The series circuit shown requires both closing of the electromechanical switch of deceleration sensor 40 and activation of current source 34 through control line 36 coupled to a microprocessor or other form of controller.

The advantage of the system shown allows for switch 40 to be closed first while high side driver 34 remains inactive. Then after a very short but real delay, high current source 34 may be activated by a control signal through line 36. Such an implementation allows the switch of sensor 40 to close without causing arcing of its contacts and, therefore, without destroying the switch.

Current source 34 is powered from the vehicle supply voltage $+V_d$ through diode 27 or from energy reserve capacitor 30 through diode 28. Preferably, energy reserve capacitor 30 is maintained at a high voltage, such as 22 or 36 volts, by a step-up voltage source such as an inverter or switching circuit coupled to line 32.

Referring to FIG. 3, a detailed illustration of the current source 34 of this invention is shown controlled through line 36. When activated, current source 34 provides current through FET 110 and diode 118 to line 120, which is coupled to squib 38 shown in FIG. 2.

In general, when line 36 is low, FET 110 is off and no current flows through line 120. Conversely, when line 36 is selectively controlled to be high, FET 110 is selectively controlled to be on providing current regulated to a predetermined value on line 120.

More particularly, line 58 receives regulated power from a regulated supply voltage source (5 volts) and line 56 is the current source of the squib 38, which current is provided via transistor 110. The supply current for line 56 is supplied from the vehicle battery while the battery is still connected, or from a charge storage capacitor maintained at a high voltage, such as 22 volts, if the battery becomes disconnected.

When line 36 is low, transistor 46 (BCW60D) remains biased off through resistor 44. With transistor 46 off, line 56 pulls the base of transistor 52 high through resistor 48 (51.1K), thereby turning on transistor 52. When transistor 52 (MPS8096) is on, it pulls low through resistor 80 (51.1K) the base of transistor 90 (MPS8598), which turns on and pulls the gate of FET 110 (IRF9531) high, preventing FET 110 from conducting.

The 5 volts supplied on line 58 is coupled through resistor 60 (27.4K) to 1.235 volt precision reference 62, which provides the 1.235 volt reference voltage to the non-inverting input of differential amplifier 66 (MC33174) via resistor 64 (10K). Amplifier 66, with associated capacitors 68 (0.1 uF) and 70 (4.7 uF), acts as a buffer and provides, at its output, a low impedance reference voltage of 1.235 volts coupled to the non-inverting input of control amplifier 84 (MC33174) via resistor 72 (100K).

Control amplifier 84, with associated resistors 74 (100K), 76 (80.6K), 78 (80.6K) and 72 (100K) and capacitors 88 (33 pF), 92 (22 pF) and 94 (22 pF), is used to bias transistor 90, which drives and regulates FET 110 during a deployment condition. Transistor 104 (MPS8096), whose base is biased by line 56 via resistor 96 (21K) and diode 102 acts as a current source for transistor 90.

More particularly, when a control signal on line 36 is received to deploy the supplemental inflatable restraint, line 36 goes high bringing high the base of transistor 46, which becomes active and shunts the base of transistor 52. With transistor 52 off, it can no longer pull transistor 90 active. Therefore, transistor 90 can no longer maintain the FET 110 in the off state.

With transistor 52 now off, the output of control amplifier 84 maintains the base of transistor 90 high. Transistor 104 quickly activates FET 110 so that current may flow through diode 118 to line 120 and to squib 38, activating the supplemental inflatable restraint system. While FET 110 is saturated, zener diode 108 having a breakdown voltage of 8.2 volts, limits the gain to source saturation voltage of FET 110. Resistor 106 (43.2K) provides current to transistor 104, which current flows to ground through resistor 116 (13K). Resistor 114 (10.5K) and zener diode 112, which has a breakdown voltage of 3.6 volts, maintain the base of transistor 104 at 3.4 volts.

As current flows through transistor 110 to the deployment squib 38, a voltage drop develops across current sensing resistor 54. When two amperes of current flow through resistor 54, a voltage drop of 1 volt appears across resistor 54. The voltage drop of 1 volt triggers control amplifier 84, which pulls low the base of transistor 90, partially shutting off FET 110, maintaining DC current through FET 110 at a level set by the control circuitry. In this manner, the current through FET 110 is limited to two amperes providing a regulated current to the deployment squib. As long as at least 10 volts are provided on line 56, the current source 34 can provide two amperes of regulated current through line 120 (with a total load of 5 ohms or less).

The above-described apparatus of this invention provides controllable current source for driving a supplemental inflatable restraint system. If the reserve capacitor 30 is charged at a level of 22 volts and has the capacitance of 2700 uF, the apparatus shown can provide 2 amperes of current for a minimum of 5 milliseconds after a 500 millisecond loss of battery, which is sufficient to deploy the supplemental inflatable restraint, which eliminates arc destruction of the contacts of switch 40 when the switch is closed and which eliminates over-stress of FET 110. This allows for use of a smaller FET 110.

The reserve capacitor can be charged to any voltage level, limited only by the maximum voltage rating of the components used to implement the invention. The implementation set forth above is an example implementation and the part specifications and values illustrated are example specifications and values that are not central to this invention. Additionally, the regulated current can be set to any value as desired by varying the components coupled to control amplifier 84 in a manner well known to those skilled in the art.

Referring to FIG. 4, the method of this invention is shown comprising, as a first step, forward biasing a gating device such as FET 110 or other transistor in response to a deploy command to supply current flow through the gating device, which current activates a deployment initiator (block 130). The next step includes sensing current flow through the gating device (block 132), such as with current sensing resistor 54. In response to the sensed current flow, the step at block 134 partially biases off the gating device when the sensed current flow through the gating device exceeds a predetermined threshold to effective regulate the current supplied through the gating device.

Various improvements and modifications to this invention may occur to those skilled in the art and such improvements and modifications will fall within the scope of this invention as set forth below.

The embodiments of the invention in which an exclusive property or privilege is claimed are defined as follows:

1. Deployment apparatus for a supplemental inflatable restraint, comprising:
    a sense element;
    a switch device coupled to the sense element;
    a squib coupled to the switch device, wherein the sense element, switch device and squib are coupled in a series circuit between a power source and a ground.
    a deploy control circuit coupled to the switch device for forward biasing the switch device in response to a deploy command, allowing an electric current to flow through the sense element, switch device and squib to deploy the supplemental inflatable restraint; and
    a current control circuit, coupled to the sense element and switch device, which responds to said electric current in the sense element and regulates the switch device to limit said electric current to a predetermined value.

2. A controllable current source for a supplemental inflatable restraint system, comprising:
    a current sensing resistor in series with a transistor;
    a deploy control circuit coupled to a switch device, and comprising means, responsive to a deploy command, for forward biasing the switch device allowing an electric current to flow through the current sensing resistor and the transistor to deploy the supplemental inflatable restraint system; and
    a current control circuit, responsive to the current sensing resistor and controllably coupled to the transistor, including means for regulating the transistor in response to said electric current in the current sensing resistor, effectively limiting said electric current to a predetermined value.

3. A method of supplying current for deployment of a supplemental inflatable restraint, comprising the steps of:
    forward biasing a gating device in response to a deploy command to supply current flow through the gating device, which current activates a deployment initiator;
    sensing said current flow; and
    biasing off the gating device when the sensed current flow exceeds a predetermined threshold to effectively regulate said current flow.

* * * * *